(12) United States Patent
Park

(10) Patent No.: US 8,596,437 B2
(45) Date of Patent: Dec. 3, 2013

(54) SYNCHRONIZING DEVICE FOR MANUAL TRANSMISSION

(75) Inventor: Jongyun Park, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 105 days.

(21) Appl. No.: 13/304,124

(22) Filed: Nov. 23, 2011

(65) Prior Publication Data

US 2012/0279818 A1  Nov. 8, 2012

(30) Foreign Application Priority Data

May 4, 2011  (KR) .................. 10-2011-0042688

(51) Int. Cl.
*F16D 23/06*  (2006.01)

(52) U.S. Cl.
USPC .................. 192/53.361; 192/69.9; 192/114 T

(58) Field of Classification Search
USPC ............ 192/53.3, 53.34–53.342, 69.9, 114 T, 192/53.36, 53.361
See application file for complete search history.

(56) References Cited

U.S. PATENT DOCUMENTS

| 4,181,210 | A | * | 1/1980 | Bibbens | ..................... | 192/114 T |
| 4,573,371 | A | * | 3/1986 | Akutagawa | ..................... | 74/339 |
| 5,113,985 | A | * | 5/1992 | Frost | ......................... | 192/53.341 |
| 6,994,196 | B2 | * | 2/2006 | Shimura | .................. | 192/53.343 |

FOREIGN PATENT DOCUMENTS

| JP | 3412408 B2 | 3/2003 |
| JP | 2008-32072 A | 2/2008 |
| KR | 10-0504662 B1 | 8/2005 |
| KR | 10-2006-0067526 A | 6/2006 |
| KR | 10-2007-0063154 A | 6/2007 |

* cited by examiner

*Primary Examiner* — Richard M. Lorence
(74) *Attorney, Agent, or Firm* — Morgan, Lewis & Bockius LLP

(57) ABSTRACT

A synchronizing device of a manual transmission may include a clutch hub splined on a rotation shaft, a sleeve engaged to an external circumferential portion of the clutch hub by interposing a blocking key therebetween, the sleeve being movable axially, a clutch gear having a cone portion and disposed at both sides of the sleeve without an interference with the rotation shaft, a blocker ring frictionally engagable to the cone portion of the clutch gear, and a normal gear and a groove gear formed at an interior circumference of the sleeve, wherein a width of a middle portion of the groove gear may be wider than that of the normal gear, and the middle portion of the groove gear has a key supporting portion and a locking groove formed on the key supporting portion and engaged to an exterior circumference of the blocking key.

6 Claims, 8 Drawing Sheets

SYNCHRONIZING DEVICE FOR MANUAL TRANSMISSION

CROSS-REFERENCE TO RELATED APPLICATION

The present application claims priority to Korean Patent Application No. 10-2011-0042688 filed in the Korean Intellectual Property Office on May 4, 2011, the entire contents of which is incorporated herein for all purposes by this reference.

BACKGROUND OF THE INVENTION

1. Field of the Invention

The present invention relates to a synchronizing device of a manual transmission applied to a vehicle. More particularly, the present invention relates to a synchronizing device of a manual transmission which prevents abrasion of a blocking key by lowering surface pressure of the blocking key to a locking groove of a sleeve.

2. Description of Related Art

Generally, a transmission is a part of a power delivery device. The transmission is disposed between a clutch and a drive shaft so as to increase or decrease engine torque according to a driving condition of a vehicle. In addition, the transmission has a reverse device for reversing the vehicle.

A synchronizing device of a manual transmission prevents shift shock through a smooth connection of gears by engaging a driving gear with a driven gear after rotation speeds of the driving and drive gears are synchronized when the driving gear is engaged with the driven gear.

FIG. 1 is a partial perspective view of a conventional synchronizing device.

Referring to FIG. 1, a conventional synchronizing device includes a clutch hub 2, a sleeve 4, a blocking key 6, a blocker ring 8, and a clutch gear 10.

The clutch hub 2 is splined to a rotation shaft, and a plurality of recesses is formed at an exterior circumference thereof along a circumferential direction with even distances.

The sleeve 4 is splined to the exterior circumference of the clutch hub 2 and is movable in an axial direction. A sliding recess 12 is formed at an exterior circumference of the sleeve 4, and the sleeve 4 can move to the left or the right in the drawings by a shift fork inserted in the sliding recess 12.

Each blocking key 6 is disposed in the plurality of recesses formed at the external circumference of the clutch hub 2 along the circumferential direction thereof with the even distances.

A spring 14 is interposed between the blocking key 6 and the clutch hub 2, and the blocking key 6 is inserted in a locking groove 16 formed at an interior circumference of the sleeve 4 by elastic force of the spring 14.

The blocker ring 8 is typically called a synchronizer ring. The blocker ring 8 is disposed at both sides of the clutch hub 2 so as to protect the blocking key 6 and is adapted to be pushed by the sleeve 4 when the sleeve 4 moves in the axial direction so as to be frictionally synchronized with a cone portion 18 of the clutch gear 10.

The clutch gear 10 is integrally formed with a speed gear.

According to the synchronizing device, if the sleeve 4 is moved to the left or to the right in the drawing for shifting, the blocking key 6 as well as the sleeve 4 moves and pushes the blocker ring 8 to the clutch gear 10.

Then, an interior circumference of the blocker ring 8 is rubbed with the cone portion 18 of the clutch gear 10 such that rotation speeds of the clutch gear 10 and the blocker ring 8 are synchronized. If the sleeve 4 moves further at this state, the sleeve 4 and the clutch gear 10 are engaged with each other and power delivery is achieved.

FIG. 2 is a partial perspective view of an interior circumference of a sleeve applied to a conventional synchronizing device.

Referring to FIG. 2, a reference numeral 20 represents the locking groove formed at the interior circumference of the sleeve 4 and receiving the blocking key 6 therein.

The locking groove 20 is formed at a middle portion of a groove gear 22 among gears forming splines at the interior circumference of the sleeve 4. The locking groove 20 has a concave shape.

In addition, a size of the groove gear 22 is the same as that of a normal gear 24.

Since the size of the groove gear 22, however, is the same as that of the neighboring normal gear 24, a width of the locking groove 20 receiving the blocking key 6 therein is not large.

FIG. 3 is a side view of a blocking key with an assembled state for explaining problems of conventional arts.

Referring to FIG. 3, since the width of the locking groove 20 of the groove gear 22 is narrow as described above, a contact area between the blocking key 6 and the locking groove 20 is also small. Therefore, high surface pressure is applied when shifting, and abrasion may occur if a surface pressure larger than a pressure calculated from an allowable surface rigidity is applied.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a synchronizing device of a manual transmission having advantages of preventing abrasion of a blocking key by reducing a surface pressure of the blocking key to a locking groove of a sleeve.

In an aspect of the present invention, a synchronizing device of a manual transmission may include a clutch hub splined on a rotation shaft, a sleeve engaged to an external circumferential portion of the clutch hub by interposing a blocking key therebetween, the sleeve being movable axially, a clutch gear having a cone portion and disposed at both sides of the sleeve without an interference with the rotation shaft, a blocker ring frictionally engagable to the cone portion of the clutch gear, and a normal gear and a groove gear formed at an interior circumference of the sleeve, wherein a width of a middle portion of the groove gear is wider than that of the normal gear, and the middle portion of the groove gear may have a key supporting portion and a locking groove formed on the key supporting portion and engaged to an exterior circumference of the blocking key.

The blocking key may have a groove contact portion contacting to the locking groove, and width of the key supporting portion is smaller than a circumferential length of the groove contact portion.

The blocker ring is disposed at both sides of the clutch hub so as to protect the blocking key, pushed to an axial direction by the sleeve when the sleeve moves along the axial direction, and frictionally synchronized to the cone portion of the clutch gear.

The blocker ring may have a key receiving portion, wherein the key receiving portion may include a space in which the blocking key is received, a pair of supporting protrusions protruded axially from both sides of the space to form the space therebetween, and a protruding portion protruded in a radial direction from the exterior circumference of the blocker ring between the supporting protrusions and inserted in a recess formed at the clutch hub without interference.

The supporting protrusion may have a slanted surface formed at a side surface facing the space such that the blocking key is received at the slanted surface, wherein the slanted surface is formed such that width of the space becomes wider radially outwardly.

The information disclosed in this Background of the Invention section is only for enhancement of understanding of the general background of the invention and should not be taken as an acknowledgement or any form of suggestion that this information forms the prior art already known to a person skilled in the art.

Figure 1:
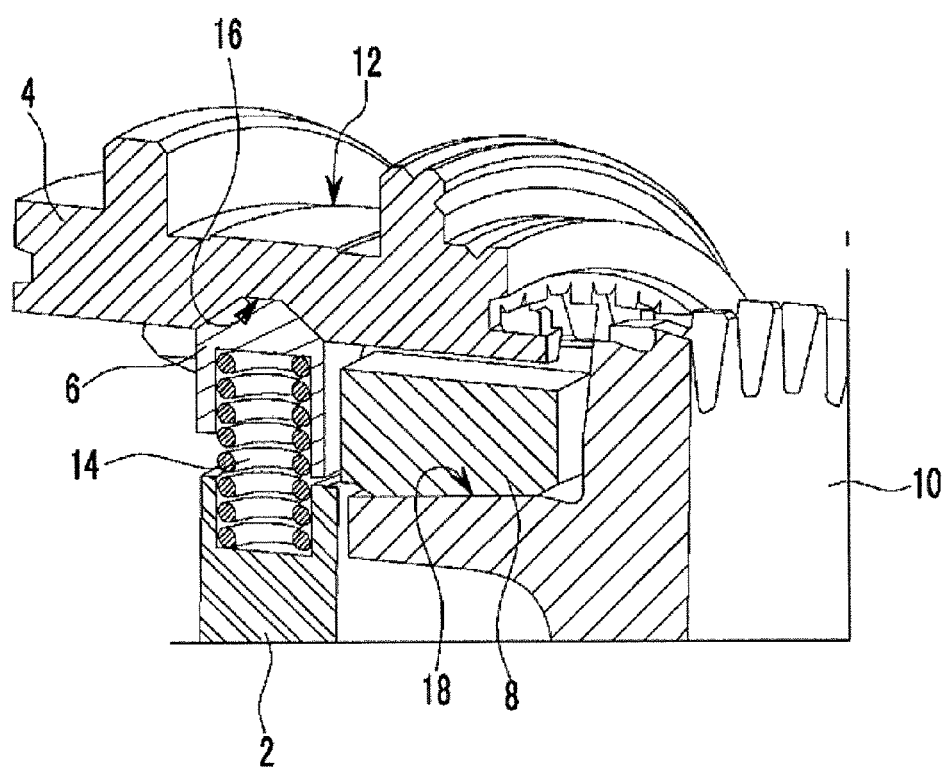
FIG. 1 is a partial perspective view of a conventional synchronizing device.
Figure 2:
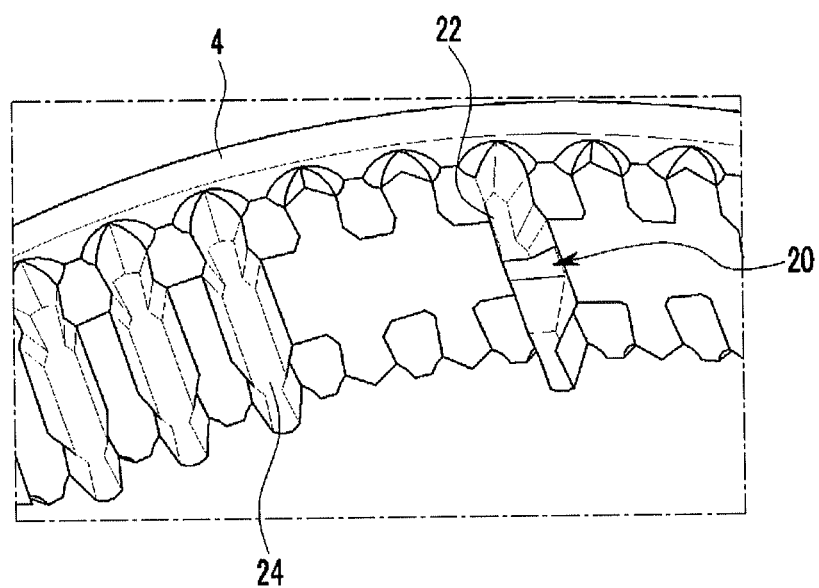
FIG. 2 is a partial perspective view of an interior circumference of a sleeve applied to a conventional synchronizing device.
Figure 3:
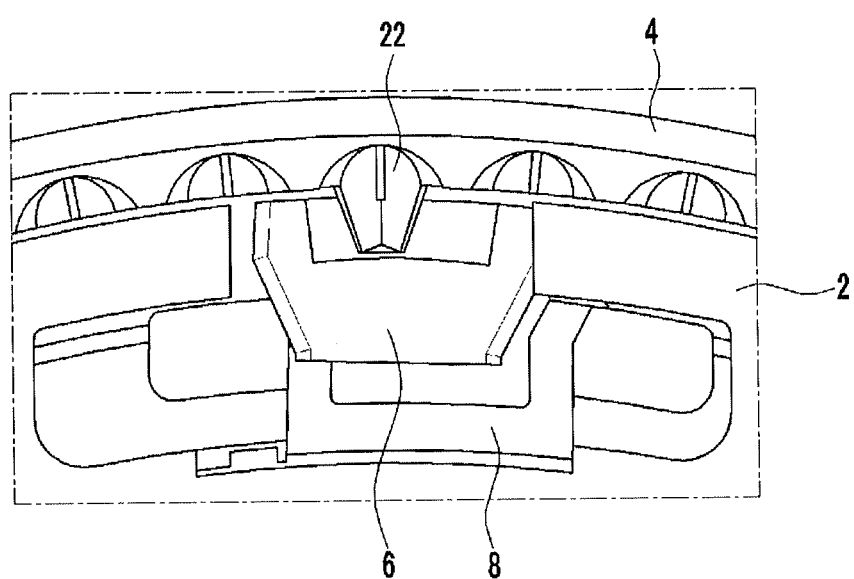
FIG. 3 is a side view of a blocking key with an assembled state for explaining problems of conventional arts.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

For clarifying description of an exemplary embodiment of the present invention, descriptions not related to the exemplary embodiment of the present invention will be omitted.

Figure 4:
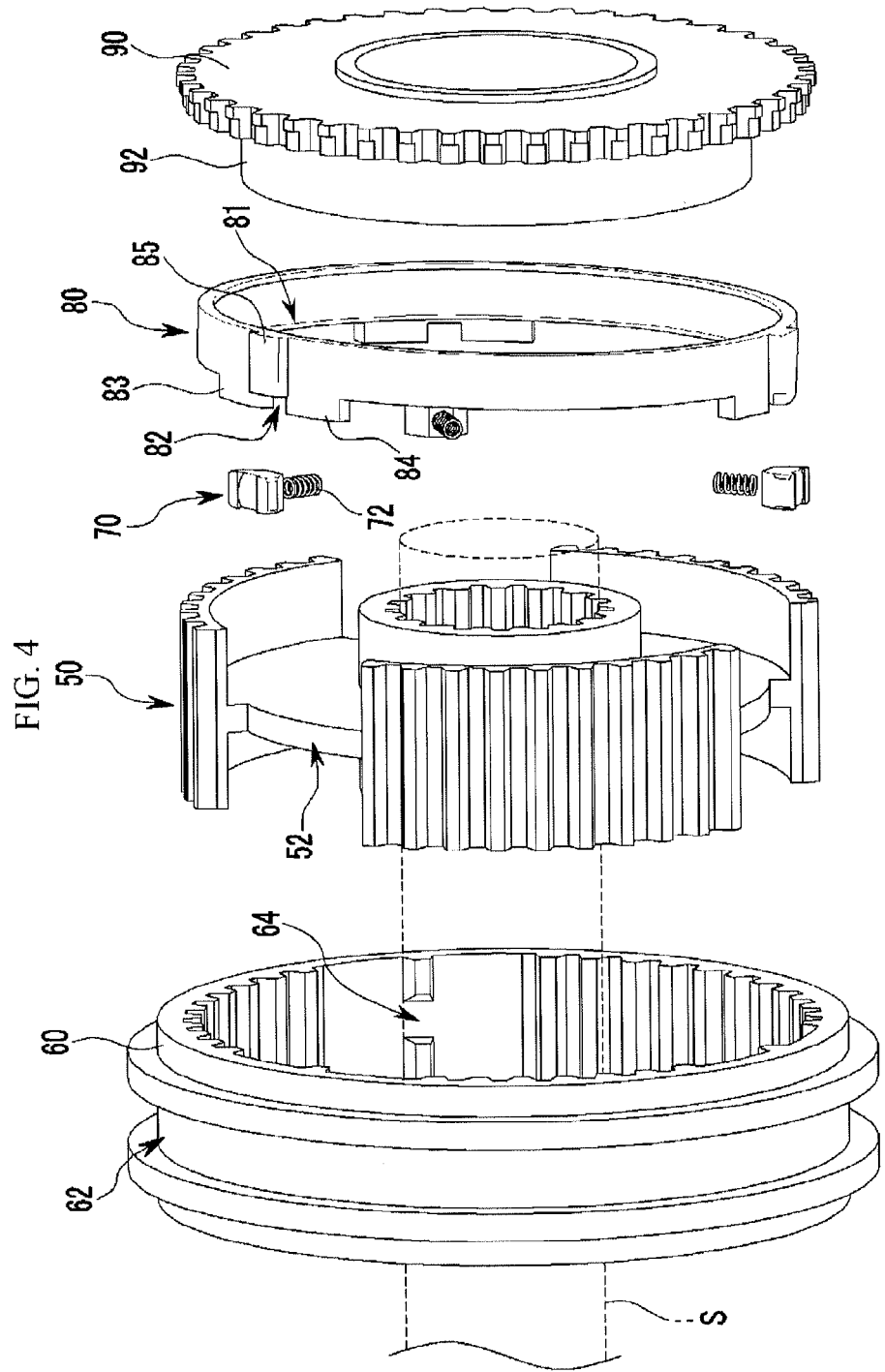
FIG. 4 is an exploded perspective view of a synchronizing device according to an exemplary embodiment of the present invention.

FIG. 4 is an exploded perspective view of a synchronizing device according to an exemplary embodiment of the present invention.

Referring to FIG. 4, a synchronizing device according to an exemplary embodiment of the present invention includes a clutch hub 50, a sleeve 60, a blocking key 70, a blocker ring 80, and a clutch gear 90.

The clutch hub 50 is splined on a rotation shaft S so as to rotate together with the rotation shaft S all the time.

Splines are formed at an exterior circumference of the clutch hub 50, and a plurality of recesses 52 is formed along a circumferential direction with even distances.

The sleeve 60 is splined to the exterior circumference of the clutch hub 50 and is movable in an axial direction. A sliding recess 62 is formed circumferentially at an exterior circumference of the sleeve 60.

In addition, a shift fork is inserted in the sliding recess 62 of the sleeve 60 such that the sleeve 60 moves in the axial direction according to a movement of the shift fork.

The blocking key 70 is disposed in the plurality of recesses 52 formed at the exterior circumference of the clutch hub 50 along a circumferential direction with the even distances. In addition, a spring 72 is interposed between the clutch hub 50 and the blocking key 70.

Therefore, the blocking key 70 is inserted in the locking groove 64 formed at the interior circumference of the sleeve 60 by elastic force of the spring 72.

The blocker ring 80 is typically called a synchronizer ring. The blocker ring 80 is disposed at both sides of the clutch hub 50 so as to protect the blocking key 70 and is adapted to be pushed by the sleeve 60 when the sleeve 60 moves in an axial direction so as to be frictionally synchronized with a cone portion 92 of the clutch gear 90.

A key receiving portion 81 is formed at the blocker ring 80.

Figure 5:
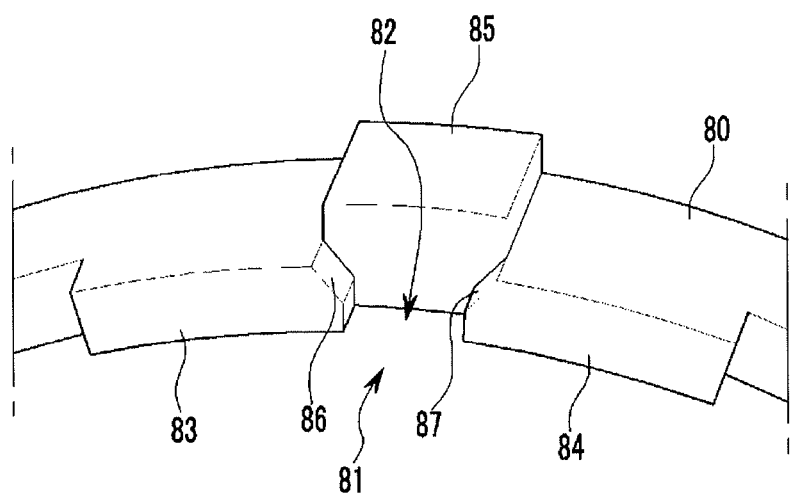
FIG. 5 is a partial perspective view of a blocker ring of synchronizing device according to an exemplary embodiment of the present invention.

FIG. 5 is a partial perspective view of a blocker ring of synchronizing device according to an exemplary embodiment of the present invention.

Referring to FIG. 5, the key receiving portion 81 includes a space 82, supporting protrusions 83 and 84, and a protruding portion 85. The supporting protrusions 83 and 84 are protruded axially at both sides of the space 82

A width of the space 82 is wide enough to receive a circumferential thickness of the blocking key 70.

In addition, a protruding portion 85 is formed at an exterior circumference of the blocker ring 80 between the supporting protrusions 83 and 84 so as to be inserted in the recess 52 of the clutch hub 50 without interference.

In addition, slanted surfaces 86 and 87 are formed at each side of the supporting protrusions 83 and 84 facing the space 82, and the blocking key 70 is received at the slanted surfaces 86 and 87. The slanted surfaces 86 and 87 are formed such that a width of the space 82 becomes wider along a radial outward direction.

In addition, the protruding portion 85 indicates an assemble position of the blocker ring 80 and maintains an assemble state of the blocker ring 80 stably. Further, the protruding portion 85 increases a contact area when the blocking key 70 moves in the axial direction.

Figure 6:
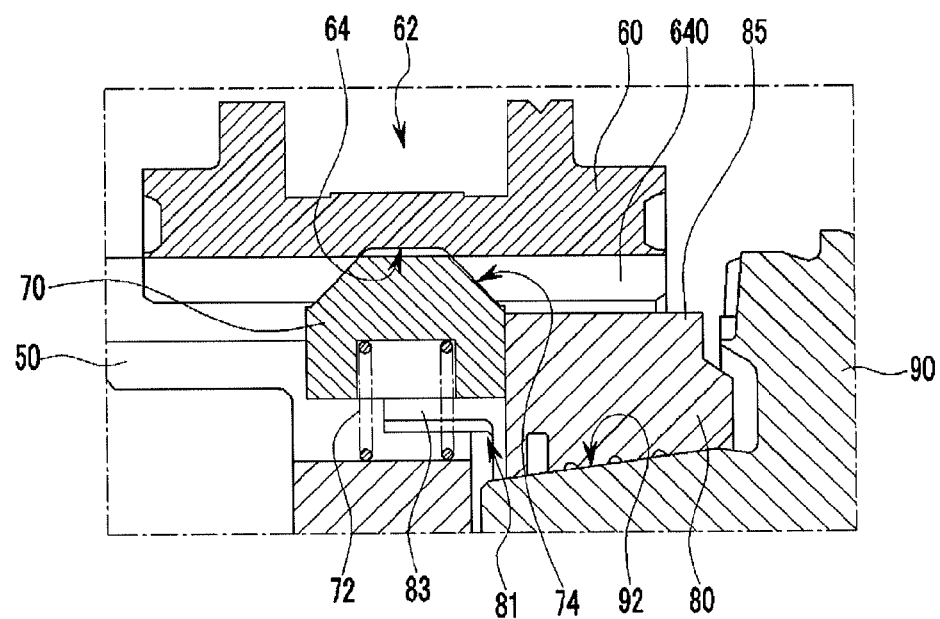
FIG. 6 is a cross-sectional view of a synchronizing device according to an exemplary embodiment of the present invention.

FIG. 6 is a cross-sectional view of a synchronizing device according to an exemplary embodiment of the present invention.

Referring to FIG. 6, if the sleeve 60 is moved to the left or right in the drawings for shifting, the blocking key 70 moves with the sleeve 60 and pushes the blocker ring 80 toward the clutch gear 90 in the synchronizing device according to an exemplary embodiment of the present invention.

Then, an interior circumference of the blocker ring 80 is rubbed with the cone portion 92 of the clutch gear 90. Therefore, rotation speeds of both elements are synchronized.

At this state, if the sleeve 60 is moved further to the left or to the right in the drawings, the sleeve 60 are synchronized and engaged with the clutch gear 90. Therefore, torque of the rotation shaft S is delivered to a speed gear integrally formed with the clutch gear 90.

Figure 7:
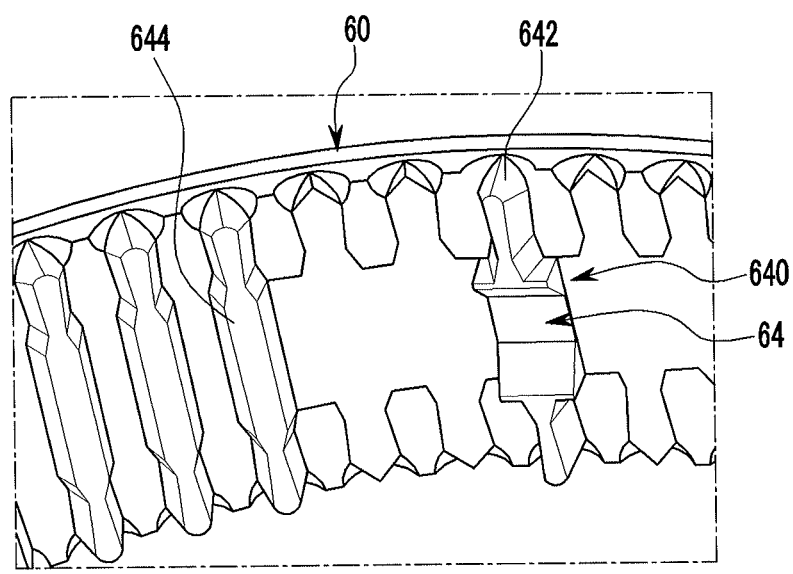
FIG. 7 is a partial perspective view of an interior circumference of a sleeve applied to a synchronizing device according to an exemplary embodiment of the present invention.
Figure 8:
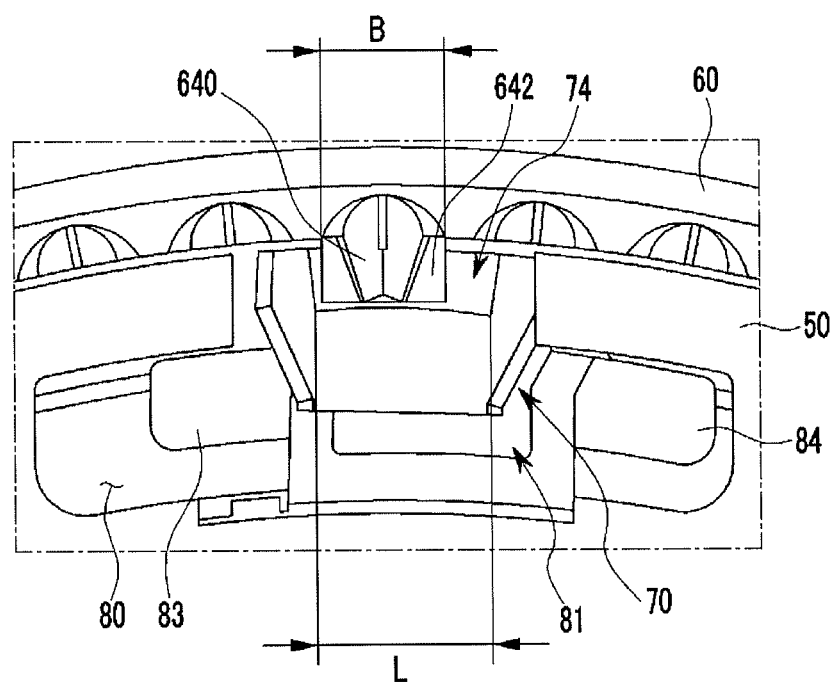
FIG. 8 is a side view of a blocking key with an assembled state of a sleeve of a synchronizing device according to an exemplary embodiment of the present invention.

FIG. 7 is a partial perspective view of an interior circumference of a sleeve applied to a synchronizing device according to an exemplary embodiment of the present invention, and FIG. 8 is a side view of a blocking key with an assembled state of a sleeve of a synchronizing device according to an exemplary embodiment of the present invention.

Referring to FIG. 7, the locking groove 64 is formed at a key supporting portion 642 and has a concave shape. The key supporting portion is formed at a middle portion of a groove gear or spline 640 among gears formed at the interior circumference of the sleeve 60.

Sizes of both end portions of the groove spline 640 is the same as those of both end portions of the normal gear or spline 644, and a width of the key supporting portion 642 formed of the locking groove 64 is wider than that of the normal gear 644. Herein, the groove spline 640 is a gear in which the blocking key 70 is inserted, and the normal spline 644 is a gear other than the groove gear 640.

In addition, the width of the locking groove 64 is the same as that width B of the key supporting portion 642.

Herein, the width B of the key supporting portion 642, as shown in FIG. 8, is smaller than a circumferential length L of the groove contact portion 74 of the blocking key 70 that contacts with the locking groove 64. A difference between the width B of the key supporting portion 642 and the circumferential length L of the groove contact portion 74 is larger than a circumferential movement of the blocking key 70.

In addition, since the both end portions of the groove gear 640 have the same size as those of the normal spline 644, the groove spline is not interfered with the clutch gear 90 after synchronizing.

If the width of the locking groove 64 and the width B of the key supporting portion 642 are large, the contact area with the blocking key 70 is also large. In addition, if the contact area is large, a surface pressure is low.

Therefore, if the surface pressure larger than a pressure determined from an allowable surface rigidity is applied, abrasion of the blocking key 70 may be prevented and durability of a transmission may be improved.

Since a width of a locking groove of a sleeve in which an external circumference of a blocking key is inserted is large, a contact area with the blocking key is also large according to an exemplary embodiment of the present invention.

Therefore, if a surface pressure larger than a pressure determined from an allowable surface rigidity is applied, abrasion of the blocking key may be prevented and durability of a transmission may be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A synchronizing device of a manual transmission comprising:
   a clutch hub splined on a rotation shaft;
   a sleeve engaged to an external circumferential portion of the clutch hub by interposing a blocking key therebetween, the sleeve being movable axially;
   a clutch gear having a cone portion and disposed at one side of the sleeve without an interference with the rotation shaft;
   a blocker ring frictionally engagable to the cone portion of the clutch gear; and
   a plurality of normal splines and a plurality of groove splines extending across an interior circumference of the sleeve;
   wherein the normal splines extend uninterrupted across the interior circumference of the sleeve;
   wherein each groove spline has a key supporting portion and a locking groove formed on the key supporting portion engaged to an exterior circumference of the blocking key; and
   wherein a width of a middle portion of each groove spline is wider than that of the normal splines, and the middle portion of the groove spline has the key supporting portion and the locking groove.

2. The synchronizing device of claim 1, wherein the blocking key has a groove contact portion contacting to the locking groove, and width of the key supporting portion is smaller than a circumferential length of the groove contact portion.

3. The synchronizing device of claim 1, wherein the blocker ring is disposed at one side of the clutch hub so as to protect the blocking key, pushed to an axial direction by the sleeve when the sleeve moves along the axial direction, and frictionally synchronized to the cone portion of the clutch gear.

4. A synchronizing device of a manual transmission comprising:
   a clutch hub splined on a rotation shaft;
   a sleeve engaged to an external circumferential portion of the clutch hub by interposing a blocking key therebetween, the sleeve being movable axially;
   a clutch gear having a cone portion and disposed at one side of the sleeve without an interference with the rotation shaft;
   a blocker ring frictionally engagable to the cone portion of the clutch gear; and
   a normal spline and a groove spline formed at an interior circumference of the sleeve;
   wherein a width of a middle portion of the groove spline is wider than that of the normal gear, and the middle portion of the groove spline has a key supporting portion and a locking groove formed on the key supporting portion engaged to an exterior circumference of the blocking key;

wherein the blocker ring is disposed at one side of the clutch hub so as to protect the blocking key, pushed to an axial direction by the sleeve when the sleeve moves along the axial direction, and frictionally synchronized to the cone portion of the clutch gear;

wherein the blocker ring has a key receiving portion; and wherein the key receiving portion includes a space in which the blocking key is received, a pair of supporting protrusions protruded axially from both sides of the space to form the space therebetween, and a protruding portion protruded in a radial direction from the exterior circumference of the blocker ring between the supporting protrusions and inserted in a recess formed at the clutch hub without interference.

5. The synchronizing device of claim 4, wherein each of the supporting protrusions has a slanted surface formed at a side surface facing the space such that the blocking key is received at the slanted surface.

6. The synchronizing device of claim 5, wherein the slanted surface is formed such that width of the space becomes wider radially outwardly.

* * * * *